UNITED STATES PATENT OFFICE 2,539,538

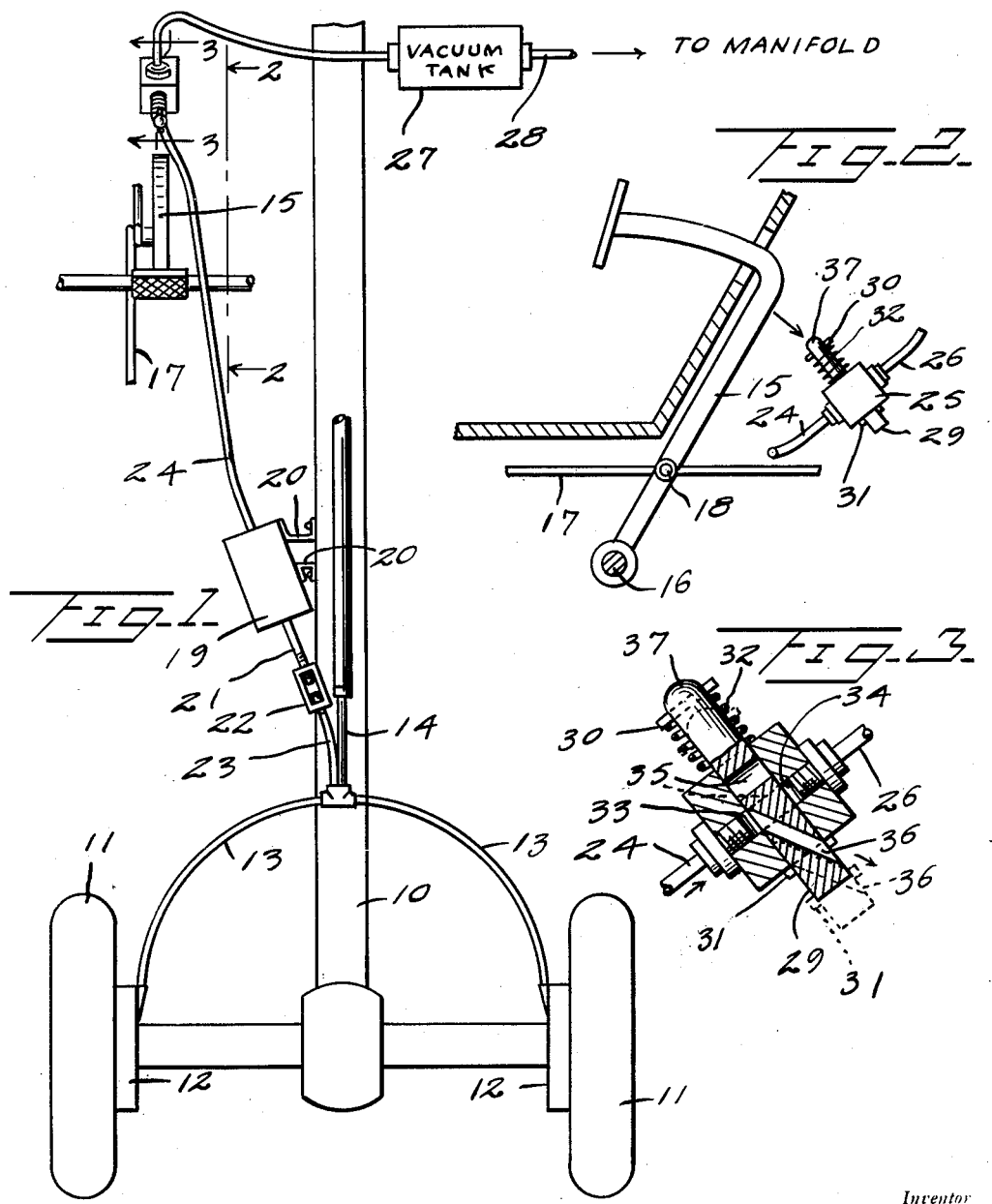

SAFETY BRAKE

Norman W. Hayes, Waltham, Mass.

Application June 13, 1947, Serial No. 754,453

1 Claim. (Cl. 188—152)

The present invention relates to a safety brake and it consists in the combinations, constructions and arrangements of parts herein described and claimed.

It is conventioned for the present day automobile to be equipped with a hand-operated brake and an independently controlled foot-operated brake, the former being known as the emergency brake. Failure of the foot brake usually leaves insufficient time for the application of the emergency brake.

The present invention provides a third brake operating means which will operate upon a failure of the foot brake by merely pushing the foot lever of such brake further than usual and thereby causing a vacuum supply to be applied to a booster which is attached to the brake cables connecting with the rear brake shoes.

It is accordingly an object of the invention to provide a brake operating means independent of the conventional hand and foot operated brakes.

A further object of the invention is the provision of a simple, inexpensive and effective means and mechanism for accomplishing the foregoing object.

Another object of the invention is the provision of a novel vacuum operated brake.

Other and further objects of the invention will become apparent from a reading of the following specification, taken in conjunction with the drawings, in which:

Figure 1 is a diagrammatic plan view of an embodiment of the invention,

Figure 2 is an enlarged sectional view taken along line 2—2 of Figure 1, and

Figure 3 is an enlarged sectional view taken along line 3—3 of Figure 2.

Referring more particularly to the drawings, there is shown therein an automobile chassis 10 provided with rear wheels 11 having brakes 12 operable by rods or other suitable members 13 which are, in turn, connected to an emergency brake rod 14.

A foot pedal 15 is pivotally mounted, as indicated at 16, and is adapted to move a rod 17 pivotally connected thereto as at 18 for operating the conventional foot brake.

A booster motor 19 is affixed to the chassis by means of brackets 20 and is connected by a rod 21, a turnbuckle 22 and a rod 23 to the rods 13.

It is to be understood that the booster is of the conventional type comprising merely a cylinder and a piston and that the rod 21 is attached to the piston (not shown) and therefore movable.

A tube 24 interconnects the booster 19 and a valve 25 which is, in turn, connected by a tube 26 to a vacuum tank 27 adapted to be constantly evacuated by a tubular connection 28 with the manifold of the automobile or some other suitable source of low pressure.

The valve has a body with a vertically extending opening in which is slidably mounted a valve plunger 29 having a detent 30 adjacent its upper end and a like detent 31 adjacent its lower end. A spring 32 is interposed between the detent 30 and the upper side of the body whereby the plunger is normally held in an upward position.

The tubes 24 and 26 are connected, respectively, with transverse openings 33 and 34 which, in turn, are interconnected by a transverse passage 35 in the plunger when the same is depressed against the action of the spring 32. The opening 33 will, however, normally connect with an angular passage 36 which communicates at all times with the atmosphere. The upper end of the plunger 29 is provided with an integrally formed head 37 which is adapted to contact with the underside of the pedal 15 when the same is fully depressed.

In operation, it will be apparent that if the foot pedal operated brakes become inoperable for any reason, it is only necessary to force the lever 15 to its full limit of movement, whereupon it will come into contact with the head 37 and cause the plunger 29 to move downwardly against the action of the spring 32 and thereby allow air to be evacuated from the booster 19 through the tube 24, through passages 35, 33 and 34 and tube 26 to the vacuum tank 27 and thence to the manifold or other source of low pressure. This causes the rod 21 and its connected turnbuckle 22 and rod 23 to be drawn forwardly, thus applying the brakes 12 through the medium of the rods 13.

Release of the pedal 15 will allow the plunger to resume its normal upward position due to the action of the spring 32 thus allowing air to flow again into the booster through the opening 36, opening 32 and tube 24. The turnbuckle allows for proper adjustment of the booster to operate the brakes 12. The booster may be positioned conveniently at a variety of places upon the chassis or body and may thus be used on all makes of automobiles.

While but one form of the invention has been shown and described herein, it will be readily apparent to those skilled in the art that many minor modifications may be made herein without departing from the spirit of the invention or the scope of the appended claim.

What is claimed is:

In an auxiliary brake applying system for vehicles, a booster including a cylinder and a piston in the cylinder having a rod projecting from one end of the cylinder and adapted for connection with emergency brake operating mechanism, a pipe line extending from the other end of said cylinder for connecting the cylinder with a vacuum tank, and a control valve in the pipe line comprising a casing formed with a vertical passage and side ports with which portions of the pipe line connect, a plunger slidable vertically through said passage and formed with a transverse passage for registering with the side ports and with a diagonally extending passage under its transverse passage and of a length adapting its upper end to register with one side port and its lower end terminating below the casing when the plunger is in a raised position, a spring urging the plunger upwardly and yieldably holding it in a normally raised position, and a member limiting upward movement of the plunger.

NORMAN W. HAYES.

REFERENCES CITED

The following references are of record in the file of this patent:

UNITED STATES PATENTS

| Number | Name | Date |
|---|---|---|
| 1,501,159 | Bartholomew | July 15, 1924 |
| 1,650,286 | Livingston | Nov. 22, 1927 |
| 2,373,272 | Stelzer | Apr. 10, 1945 |

FOREIGN PATENTS

| Number | Country | Date |
|---|---|---|
| 546,796 | Germany | Mar. 21, 1932 |